(12) United States Patent
Chen (10) Patent No.: US 11,431,246 B2
(45) Date of Patent: Aug. 30, 2022

(54) POWER CONVERTER WITH AUTOMATIC BALANCE MECHANISM OF FLYING CAPACITOR

(71) Applicant: ANPEC ELECTRONICS CORPORATION, Hsinchu (TW)

(72) Inventor: Fu-Chuan Chen, Hsinchu (TW)

(73) Assignee: ANPEC ELECTRONICS CORPORATION, Hsinchu (TW)

(*) Notice: Subject to any disclaimer, the term of this patent is extended or adjusted under 35 U.S.C. 154(b) by 96 days.

(21) Appl. No.: 17/016,680

(22) Filed: Sep. 10, 2020

(65) Prior Publication Data

US 2022/0029534 A1 Jan. 27, 2022

(30) Foreign Application Priority Data

Jul. 21, 2020 (TW) ................................. 109124538

(51) Int. Cl.
*H02M 3/07* (2006.01)
*H02M 1/08* (2006.01)
*H02M 1/00* (2006.01)

(52) U.S. Cl.
CPC ............. *H02M 3/073* (2013.01); *H02M 1/08* (2013.01); *H02M 1/0012* (2021.05)

(58) Field of Classification Search
CPC ....... H02M 1/0012; H02M 1/08; H02M 3/073
USPC ........................................................ 323/271
See application file for complete search history.

(56) References Cited

U.S. PATENT DOCUMENTS

| 9,929,653 | B1* | 3/2018 | Mercer ................ H02M 7/4837 |
| 10,090,763 | B1 | 10/2018 | Mercer et al. | |
| 2003/0214274 | A1* | 11/2003 | Lethellier ........... H02M 3/1584 323/272 |
| 2013/0271214 | A1* | 10/2013 | Van Holland ......... H03F 3/2178 330/251 |
| 2014/0063884 | A1* | 3/2014 | Itoh ..................... H02M 7/5387 363/132 |
| 2016/0118887 | A1* | 4/2016 | Zhang .................. H02M 3/158 323/271 |
| 2016/0329809 | A1* | 11/2016 | Granato .............. H02M 7/4837 |
| 2019/0207519 | A1* | 7/2019 | Chakraborty ........... H02M 1/36 |
| 2020/0195133 | A1* | 6/2020 | Bonnano ............... H02M 3/158 |

FOREIGN PATENT DOCUMENTS

CN 107636947 A 1/2018

* cited by examiner

*Primary Examiner* — Yemane Mehari (74) *Attorney, Agent, or Firm* — Li & Cai Intellectual Property (USA) Office (57) ABSTRACT

A power converter with an automatic balance mechanism of a flying capacitor is provided. The flying capacitor and a first terminal of an output inductor are connected to a switch circuit. Two terminals of an output capacitor are respectively connected to a second terminal of the output inductor and grounded. Two input terminals of an error amplifier are respectively connected to a node between the output capacitor and the output inductor, and coupled to a reference voltage. The error amplifier outputs an error amplified signal according to a voltage of the node and the reference voltage. A comparator circuit receives a ramp signal. A slope of the ramp signal is proportional to a voltage of the flying capacitor. The comparator circuit compares the ramp signal with the error amplified signal to output a comparison signal. The driving circuit drives the switch circuit according to the comparison signal.

7 Claims, 12 Drawing Sheets

POWER CONVERTER WITH AUTOMATIC BALANCE MECHANISM OF FLYING CAPACITOR

CROSS-REFERENCE TO RELATED PATENT APPLICATION

This application claims the benefit of priority to Taiwan Patent Application No. 109124538, filed on Jul. 21, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a power converter, and more particularly to a power converter with an automatic balance mechanism of a flying capacitor.

BACKGROUND OF THE DISCLOSURE

With the popularization of an ultrahigh speed internet and an Internet of Things (IoT) network, a DC-DC buck converter is required for energy transmission between circuit components. A conventional two-level DC-DC buck converter must use power components that can withstand a high voltage for an advanced manufacturing process of complementary metal oxide semiconductors, but it increases product costs. In contrast, a conventional three-level DC-DC buck converter has a lower ripple voltage, a lower ripple inductor current and halving gate driving voltages of switch components, and thus outputs a voltage having lower noise. However, due to factors such as process variation and parasitic effects of switch components of a conventional multi-level DC-DC converter, the switch components cannot be stably turned on and a voltage of a flying capacitor of the conventional multi-level DC-DC converter is imbalance.

SUMMARY OF THE DISCLOSURE

In response to the above-referenced technical inadequacies, the present disclosure provides a power converter with an automatic balance mechanism of a flying capacitor. The power converter includes a switch circuit, a flying capacitor, an output circuit, an error amplifier, a comparator circuit, and a driving circuit. The switch circuit is coupled to an input voltage. The flying capacitor is connected to the switch circuit. The output circuit includes an output capacitor and an output inductor. A first terminal of the output inductor is connected to the switch circuit. Two terminals of the output capacitor are respectively connected to a second terminal of the output inductor and grounded. An error amplifier has a first input terminal connected to an output node between the output capacitor and the output inductor. The error amplifier has a second input terminal coupled to a reference voltage. The error amplifier is configured to output an error amplified signal according to an output voltage of the output node and the reference voltage. The comparator circuit is connected to the error amplifier and configured to compare the error amplified signal with a ramp signal to output a comparison signal. A slope of the ramp signal is proportional to a voltage of the flying capacitor. A difference between the input voltage and the voltage of the flying capacitor is proportional to the slope of the ramp signal. The driving circuit is connected to the comparator circuit and the switch circuit, and configured to drive the switch circuit according to the comparison signal.

In certain embodiments, the power converter further includes a logic circuit. The logic circuit is connected between the driving circuit and the comparator circuit. The logic circuit is configured to output a logic signal according to the comparison signal. The driving circuit drives the driving circuit according to the logic signal.

In certain embodiments, the switch circuit includes a first transistor, a second transistor, a third transistor and a fourth transistor. A first terminal of the first transistor is coupled to the input voltage. A first terminal of the second transistor is connected to a second terminal of the first transistor. A second terminal of the second transistor is connected to a first terminal of the third transistor. A first terminal of the fourth transistor is connected to a second terminal of the third transistor, and a second terminal of the fourth transistor is grounded. The first terminal of the output inductor is connected to a node between the second terminal of the second transistor and the first terminal of the third transistor. The driving circuit is connected to a control terminal of the first transistor, a control terminal of the second transistor, a control terminal of the third transistor and a control terminal of the fourth transistor. A first terminal of the flying capacitor is connected to a node between the second terminal of the first transistor and the first terminal of the second transistor. A second terminal of the flying capacitor is connected to a node between the second terminal of the third transistor and the first terminal of the fourth transistor.

In certain embodiments, the driving circuit includes a first inverter, a second inverter, a third inverter, a fourth inverter, a fifth inverter and a sixth inverter. Negative terminals of the first inverter, the second inverter, the third inverter, the fourth inverter, the fifth inverter and the sixth inverter are respectively connected to the control terminals of the first transistor, the second transistor, the third transistor and the fourth transistor. Positive terminals of the first inverter and the second inverter are respectively connected to negative terminals of the fifth inverter and the sixth inverter. Positive terminals of the third inverter, the fourth inverter, the fifth inverter and the sixth inverter are connected to an output terminal of the comparator circuit.

In certain embodiments, the comparator circuit includes a first comparator and a second comparator. A first input terminal of the first comparator and a first input terminal of the second comparator are connected to the error amplifier and receive the error amplified signal. A second input terminal of the first comparator and a second input terminal of the second comparator are respectively coupled to a first ramp signal and a second ramp signal that are included in the ramp signal. An output terminal of the first comparator is connected to the positive terminals of the fourth inverter and the fifth inverter. An output terminal of the second comparator is connected to the positive terminals of the third inverter and the sixth inverter.

In certain embodiments, the power converter further includes a logic circuit. The logic circuit is connected between the driving circuit and the comparator circuit. The logic circuit includes a first inverter and a second inverter. Two input terminals of the first inverter are respectively connected to the output terminal of the first comparator and coupled to a first clock signal. An output terminal of the first inverter is connected to the positive terminals of the fourth inverter and the fifth inverter. Two input terminals of the second inverter are respectively connected to the output terminal of the second comparator and coupled to a second clock signal. An output terminal of the second inverter is connected to the positive terminals of the third inverter and the sixth inverter.

In certain embodiments, the power converter further includes a ramp signal generator. The ramp signal generator is connected to the second input terminal of the first comparator and the second input terminal of the second comparator. The ramp signal generator is configured to output the first ramp signal and the second ramp signal respectively to the second input terminals of the first comparator and the second comparator, according to the input voltage and the voltage of the flying capacitor.

In certain embodiments, the power converter further includes a voltage divider circuit. The voltage divider circuit is connected to the output node and the first input terminal of the error amplifier. The voltage divider circuit is configured to divide the output voltage of the output node to output a feedback voltage to the first input terminal of the error amplifier. The error amplifier is configured to output the error amplified signal according to the feedback voltage and reference voltage.

In certain embodiments, the voltage divider circuit includes a first voltage divider resistor and a second voltage divider resistor. The first input terminal of the error amplifier is connected to a feedback node between the first voltage divider resistor and the second voltage divider resistor. The feedback voltage is at the feedback node.

As described above, the power converter with the automatic balance mechanism of the flying capacitor of the present disclosure adjusts the working period of the logic signals for controlling the switch circuit according to the ramp signal having a slope that is proportional to the voltage of the flying capacitor, such that the voltage of the flying capacitor is balanced to be equal to the one half of the input voltage.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 1:
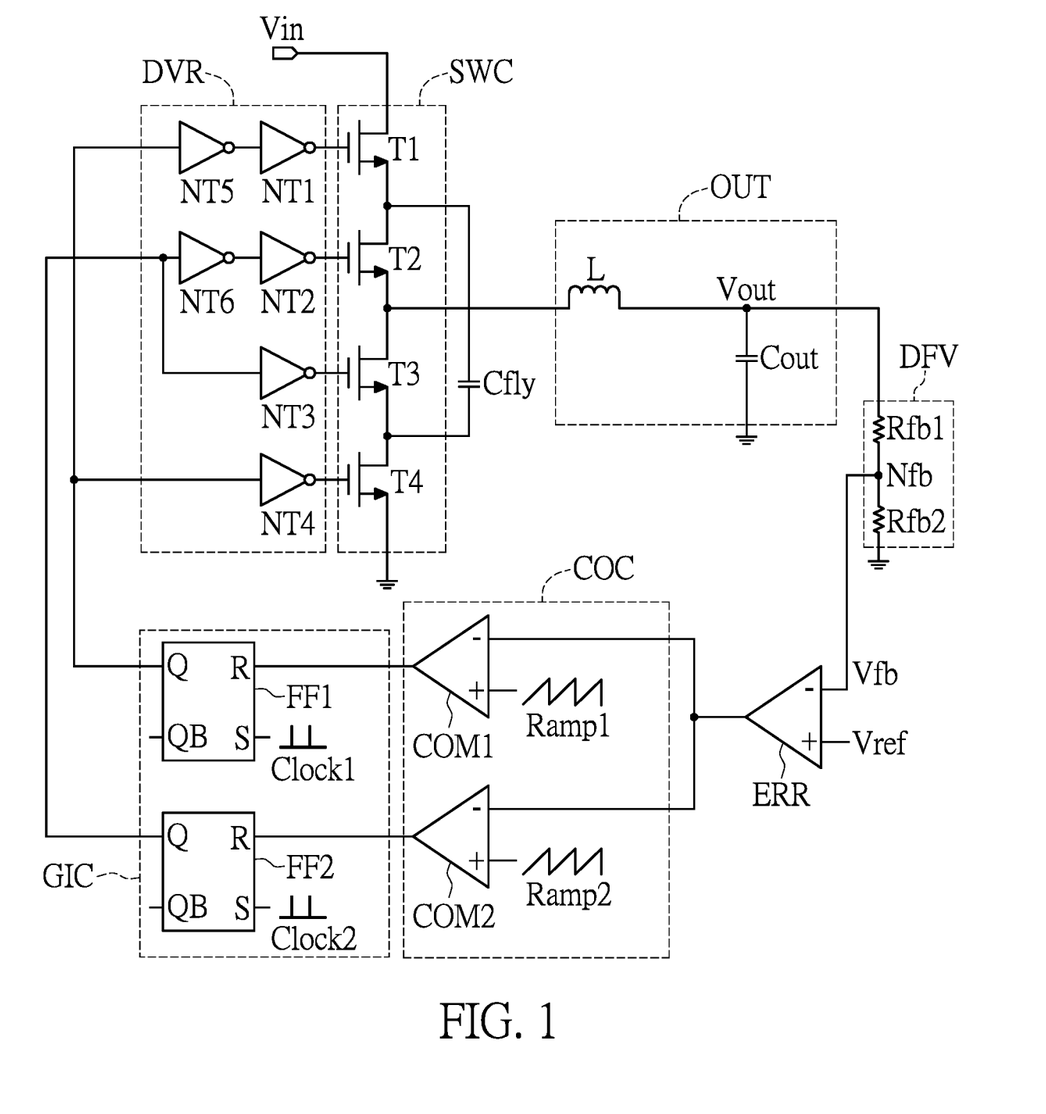
FIG. 1 is a circuit layout diagram of a power converter with an automatic balance mechanism of a flying capacitor according to a first embodiment of the present disclosure.

Reference is made to FIG. 1, which is a circuit layout diagram of a power converter with an automatic balance mechanism of a flying capacitor according to a first embodiment of the present disclosure.

As shown in FIG. 1, in the embodiment, the power converter with the automatic balance mechanism of the flying capacitor may include a switch circuit SWC, a flying capacitor Cfly, an output circuit OUT, an error amplifier ERR, a comparator circuit COC, and a driving circuit DVR.

An input terminal of the comparator circuit COC is connected to an output terminal of the error amplifier ERR and coupled to a ramp signal. For example, in the embodiment, the comparator circuit COC may include a first comparator COM1 and a second comparator COM2. A first input terminal such as an inverting input terminal of the first comparator COM1 and a first input terminal such as an inverting input terminal of the second comparator COM2 are connected to the output terminal of the error amplifier ERR.

A second input terminal such as a non-inverting input terminal of the first comparator COM1 is coupled to a first ramp signal Ramp1 that is included in the ramp signal. A second input terminal such as a non-inverting input terminal of the first comparator COM2 is coupled to a second ramp signal Ramp2 that is included in the ramp signal.

If a logic circuit GIC is not disposed, an output terminal of the comparator circuit COC is connected to an input terminal of the driving circuit DVR. In detail, an output terminal of the first comparator COM1 of the comparator circuit COC may be connected to a positive terminal of a fourth inverter NT4 and a positive terminal of a fifth inverter NT5. An output terminal of the second comparator COM2 may be connected to a positive terminal of a third inverter NT3 and a positive terminal of a sixth inverter NT6.

If necessary, the power converter with the automatic balance mechanism of the flying capacitor in the embodiment may further include a logic circuit GIC. The logic circuit GIC is connected between the comparator circuit COC and the driving circuit DVR. For example, the logic circuit GIC may include a first flip-flop FF1 and a second flip-flop FF2 such as RS flip-flops, but the present disclosure is not limited thereto.

A first input terminal R of the first flip-flop FF1 is connected to the output terminal of the first comparator COM1. A second input terminal S of the first flip-flop FF1 is coupled to a first clock signal Clock1. In other words, the second input terminal S of the first flip-flop FF1 is connected to a clock circuit (that is not shown in figures), and receives the first clock signal Clock1 from the clock circuit.

A first input terminal R of the second flip-flop FF2 is connected to the output terminal of the second comparator COM2. A second input terminal S of the second flip-flop FF2 is coupled to a second clock signal Clock2. In other words, the second input terminal S of the second flip-flop FF2 is connected to a clock circuit (that is not shown in figures), and receives the second clock signal Clock2 from the clock circuit.

The driving circuit DVR may include a first inverter NT1, a second inverter NT2, the third inverter NT3, the fourth inverter NT4, the fifth inverter NT5, and the sixth inverter NT6. The positive terminal of the fourth inverter NT4 and the positive terminal of the fifth inverter NT5 are connected to an output terminal Q of the first flip-flop FF1. The positive terminal of the third inverter NT3 and the positive terminal of the sixth inverter NT6 are connected to an output terminal Q of the second flip-flop FF2. A negative terminal of the fifth inverter NT5 is connected to a positive terminal of the first inverter NT1. A negative terminal of the sixth inverter NT6 is connected to a positive terminal of the second inverter NT2.

The driving circuit DVR may be connected to the switch circuit SWC. The switch circuit SWC may include a plurality of transistors such as a first transistor T1, a second transistor T2, a third transistor T3 and a fourth transistor T4 as shown in FIG. 1. A first terminal of the first transistor T1 is coupled to an input voltage Vin.

A second terminal of the first transistor T1 is connected to a first terminal of the second transistor T2. A second terminal of the second transistor T2 is connected to a first terminal of the third transistor T3. A second terminal of the third transistor T3 is connected to a first terminal of the fourth transistor T4. A second terminal of the fourth transistor T4 is grounded. A negative terminal of the first inverter NT1 is connected to a control terminal of the first transistor T1.

A negative terminal of the second inverter NT2 is connected to a control terminal of the second transistor T2. A negative terminal of the third inverter NT3 is connected to a control terminal of the third transistor T3. A negative terminal of the fourth inverter NT4 is connected to a control terminal of the fourth transistor T4.

A first terminal of the flying capacitor Cfly is connected to a node between the second terminal of the first transistor T1 and the first terminal of the second transistor T2. A second terminal of the flying capacitor Cfly is connected to a node between the second terminal of the third transistor T3 and the first terminal of the fourth transistor T4.

A first terminal of an output inductor L of the output circuit OUT is connected to a node between the second terminal of the second transistor T2 and the first terminal of the third transistor T3. A second terminal of the output inductor L is connected to a first terminal of an output capacitor Cout of the output circuit OUT. A second terminal of the output capacitor Cout is grounded. A node between the output inductor L and the output capacitor Cout is an output node of the power converter. An output voltage Vout is at the output node.

The error amplifier ERR has a first input terminal such as an inverting input terminal and a second input terminal such as a non-inverting input terminal. The first input terminal of the error amplifier ERR may be connected to the node between the output inductor L and the output capacitor Cout. The first input terminal of the error amplifier ERR may receive the output voltage Vout of the output node. The second input terminal of the error amplifier ERR may be coupled to a reference voltage Vref.

Optionally, a voltage divider circuit DFV may be disposed between the error amplifier ERR and the output circuit OUT. The voltage divider circuit DFV may be connected to the node between the output inductor L and the output capacitor Cout and connected to the first input terminal of the error amplifier ERR.

In detail, the voltage divider circuit DFV may include a first voltage divider resistor Rfb1 and a second voltage divider resistor Rfb2. The first input terminal of the error amplifier ERR is connected to a feedback node Nfb between the first voltage divider resistor Rfb1 and the second voltage divider resistor Rfb2. A feedback voltage Vfb is at the feedback node Nfb. That is, the voltage divider circuit DFV may divide the output voltage Vout to output the feedback voltage Vfb to the first input terminal of the error amplifier ERR.

Figure 2:
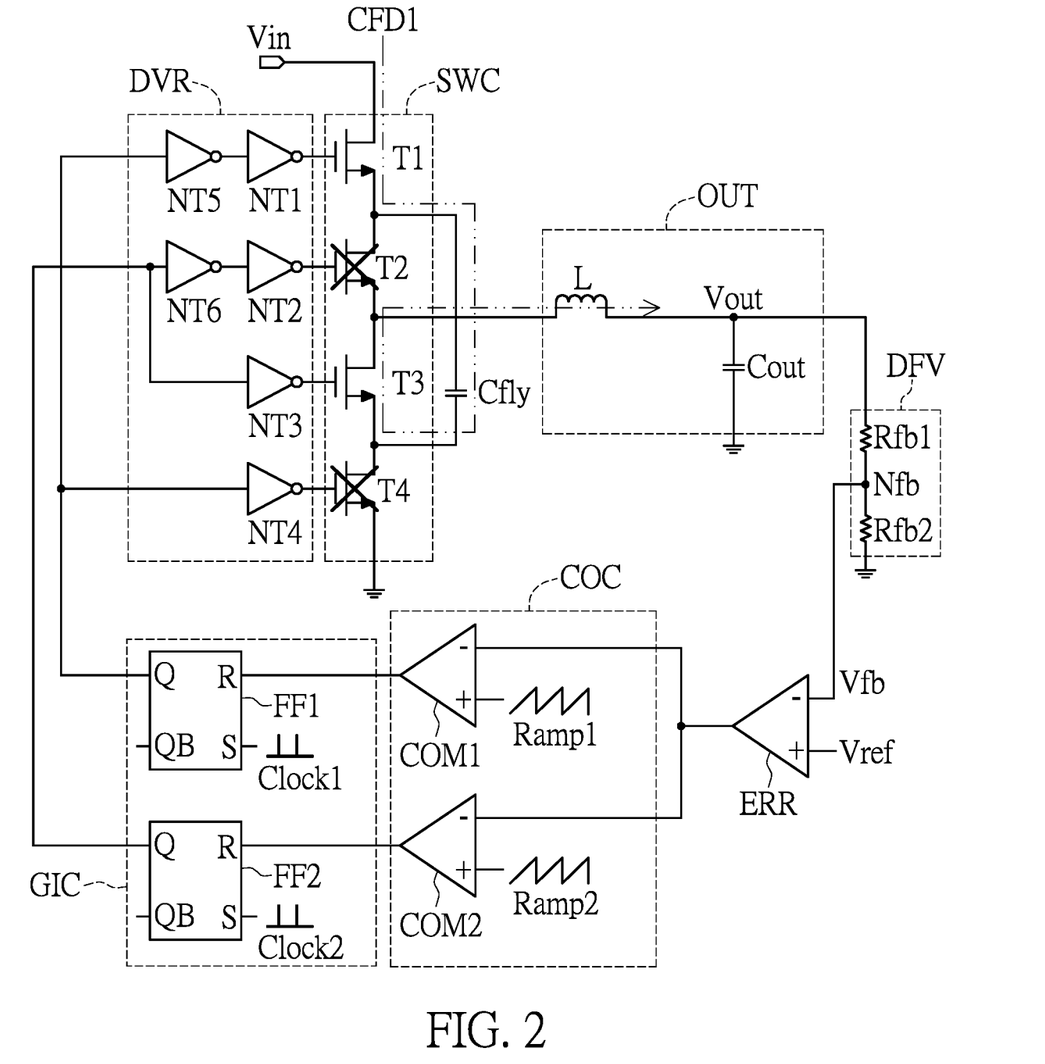
FIG. 2 is a schematic diagram of flowing of a current of the power converter with the automatic balance mechanism of the flying capacitor when first and third transistors of the power converter are turned on and second and fourth transistors of the power converter are turned off according to the first embodiment of the present disclosure.
Figure 3:
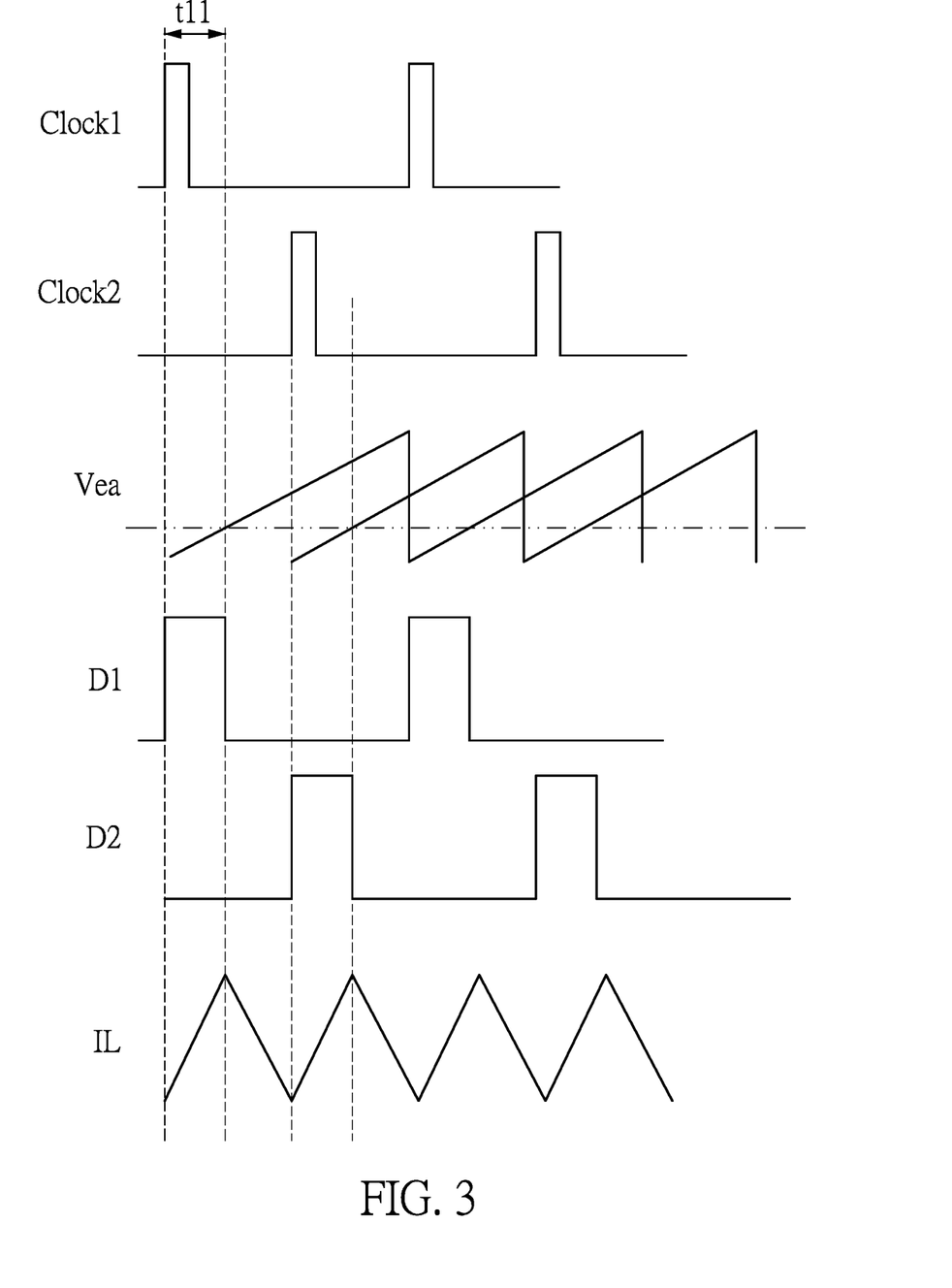
FIG. 3 is a waveform diagram of signals of the power converter with the automatic balance mechanism of the flying capacitor within a first time according to the first embodiment of the present disclosure.

Reference is made to FIGS. 2 and 3, wherein FIG. 2 is a schematic diagram of flowing of a current of the power converter with the automatic balance mechanism of the flying capacitor when first and third transistors of the power converter are turned on and second and fourth transistors of the power converter are turned off according to the first embodiment of the present disclosure, and FIG. 3 is a waveform diagram of signals of the power converter with the automatic balance mechanism of the flying capacitor within a first time according to the first embodiment of the present disclosure.

The error amplifier ERR shown in FIG. 2 may multiply a difference between the feedback voltage Vfb (or the output voltage Vout in practice) and the reference voltage Vref by a gain value to output an error amplified signal Vea as shown in FIG. 3. Then, the first comparator COM1 compares a voltage of the first ramp signal Ramp1 with a voltage of the error amplified signal Vea to output a first comparison signal. The second comparator COM2 compares the voltage of the second ramp signal Ramp2 with the voltage of the error amplified signal Vea to output a second comparison signal.

The first input terminal R of the first flip-flop FF1 receives the first comparison signal from the first comparator COM1. The second input terminal S of the first flip-flop FF1 receives the first clock signal Clock1 shown in FIG. 3 from the clock circuit. The first flip-flop FF1 outputs a first logic signal D1 shown in FIG. 3 to the fourth inverter NT4 and the fifth inverter NT5 according to the first comparison signal and the first clock signal Clock1 from the output terminal Q of the first flip-flop FF1.

The first logic signal D1 of the first flip-flop FF1 is sequentially inverted by the fifth inverter NT5 and the first inverter NT1, and then transmitted to the first transistor T1 and used to control the first transistor T1. In addition, the first logic signal D1 of the first flip-flop FF1 is inverted by the fourth inverter NT4, and then transmitted to the fourth transistor T4 and used to control the fourth transistor T4.

Similarly, the first input terminal R of the second flip-flop FF2 receives the second comparison signal from the second comparator COM2. The second input terminal S of the second flip-flop FF2 receives the second clock signal Clock2 shown in FIG. 3 from the clock circuit. The second flip-flop FF2 outputs a second logic signal D2 shown in FIG. 3 to the sixth inverter NT6 and the third inverter NT3 from the output terminal Q of the second flip-flop FF2 according to the second comparison signal and the second clock signal Clock2.

The second logic signal D2 of the second flip-flop FF2 is inverted sequentially by the sixth inverter NT6 and the second inverter NT2, and then transmitted to the second transistor T2 and used to control the second transistor T2. In addition, the second logic signal D2 of the second flip-flop FF2 is inverted by the third inverter NT3, and then transmitted to the third transistor T3 and used to control the third transistor T3.

The first flip-flop FF1 shown in FIG. 2 outputs the first logic signal D1 at a high level for turning on the first transistor T1 and turning off the fourth transistor T4 during a time t11 as shown in FIG. 3. The second flip-flop FF2 shown in FIG. 2 outputs the second logic signal D2 at a low level for turning on the third transistor T3 and turning off the second transistor T2 during the time t11 as shown in FIG. 3. Under this condition, a current flowing indicating signal CFD1 indicates that a current flows sequentially through the first transistor T1, the flying capacitor Cfly and the third transistor T3 to the output inductor L. As shown in FIG. 3, a current of an inductor current signal IL gradually increases within the time t11.

Figure 4:
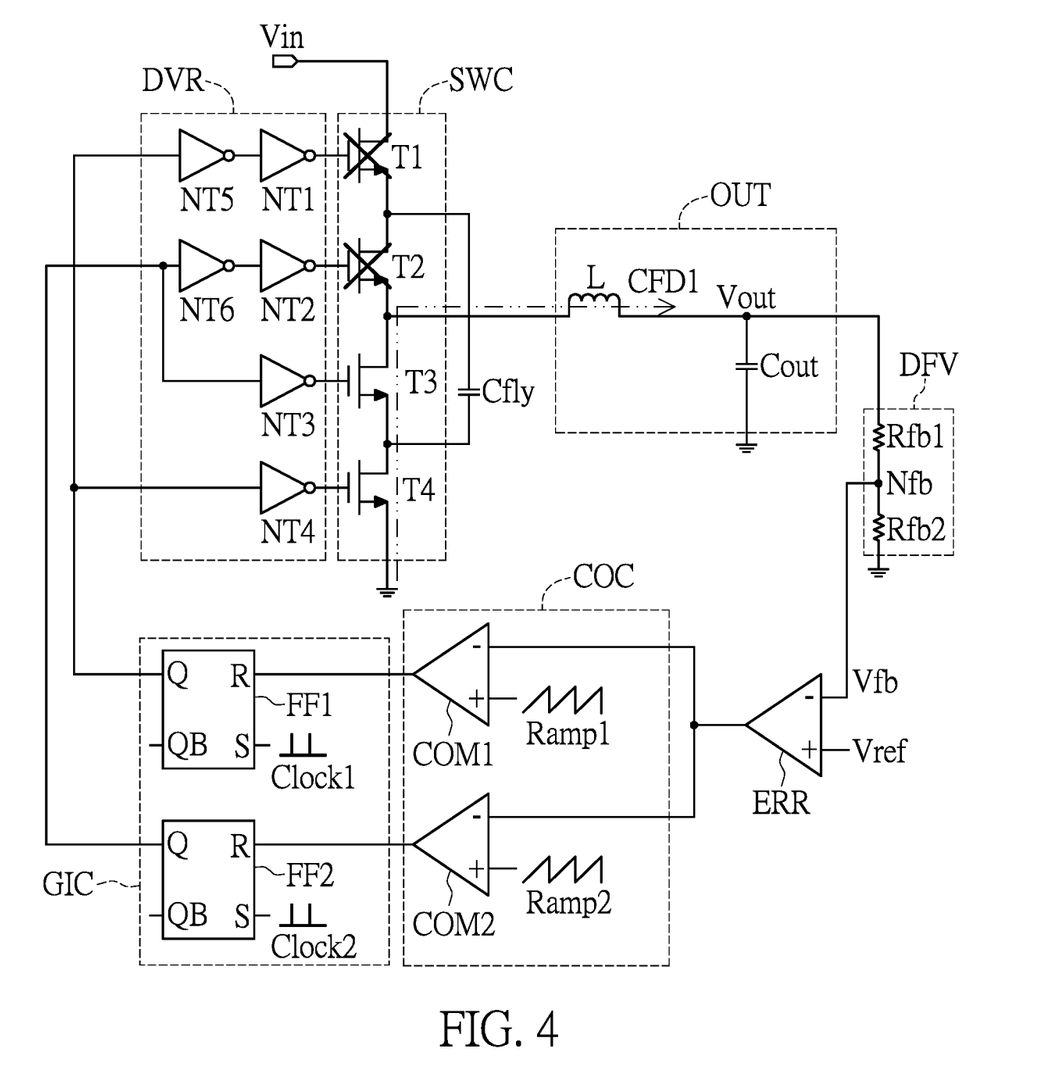
FIG. 4 is a schematic diagram of flowing of a current of the power converter with the automatic balance mechanism of the flying capacitor when the third and fourth transistors of the power converter are turned on and the first and second transistors of the power converter are turned off according to the first embodiment of the present disclosure.
Figure 5:
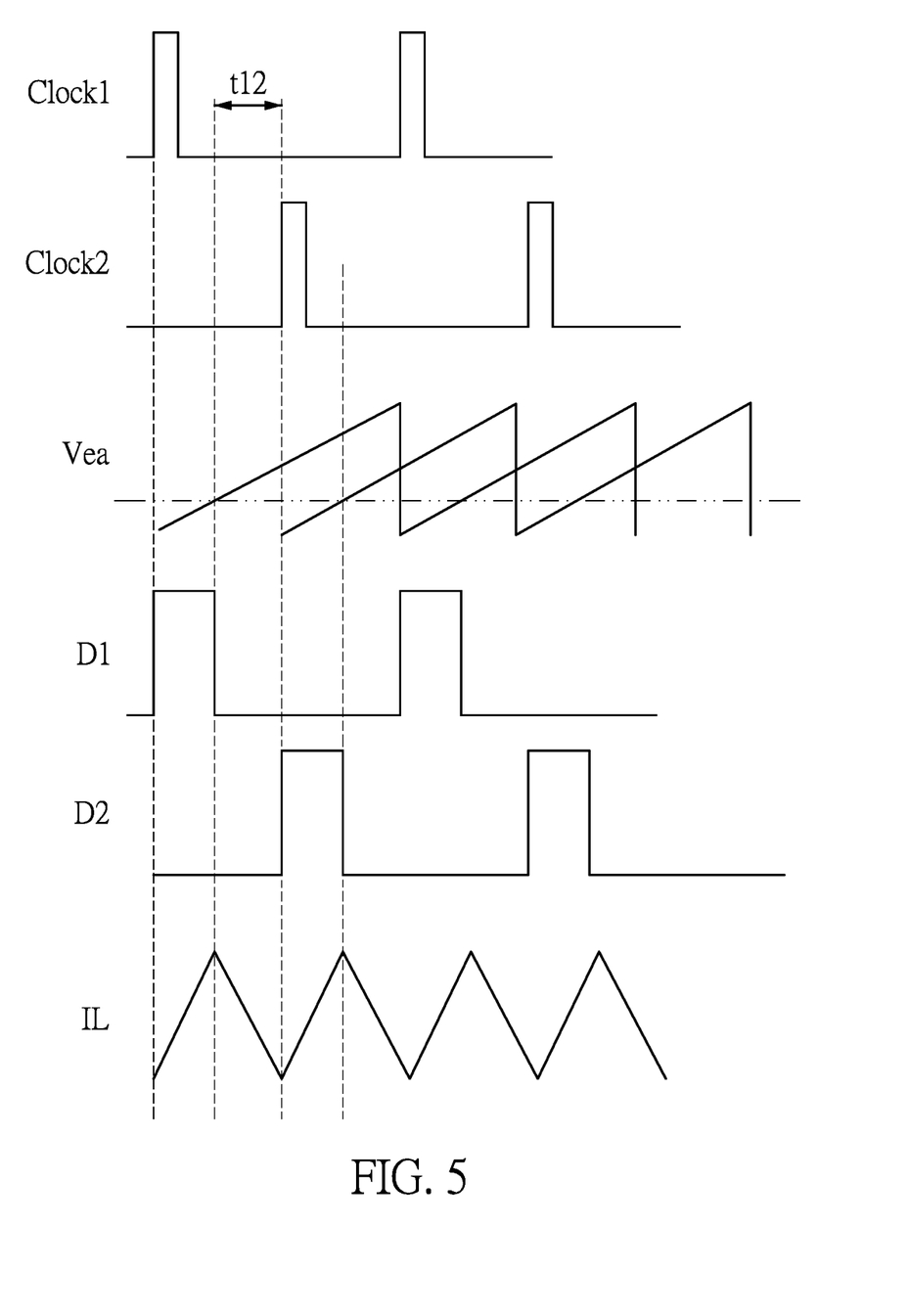
FIG. 5 is a waveform diagram of signals of the power converter with the automatic balance mechanism of the flying capacitor within a second time according to the first embodiment of the present disclosure.

Reference is made to FIGS. 4 and 5, wherein FIG. 4 is a schematic diagram of flowing of a current of the power converter with the automatic balance mechanism of the flying capacitor when the third and fourth transistors of the power converter are turned on and the first and second transistors of the power converter are turned off according to the first embodiment of the present disclosure, and FIG. 5 is a waveform diagram of signals of the power converter with the automatic balance mechanism of the flying capacitor within a second time according to the first embodiment of the present disclosure.

The first flip-flop FF1 shown in FIG. 4 outputs the first logic signal D1 at a low level for turning off the first transistor T1 and turning on the fourth transistor T4 during a time t12 as shown in FIG. 5. The second flip-flop FF2 shown in FIG. 4 outputs the second logic signal D2 at a low level for turning on the third transistor T3 and turning off the second transistor T2 during the time t12 as shown in FIG. 5.

Under this condition, the current flowing indicating signal CFD1 indicates that a current flows sequentially through the second transistor T4 and the third transistor T3 to the output inductor L. As shown in FIG. 3, the current of the inductor current signal IL gradually reduces within the time t12.

Figure 6:
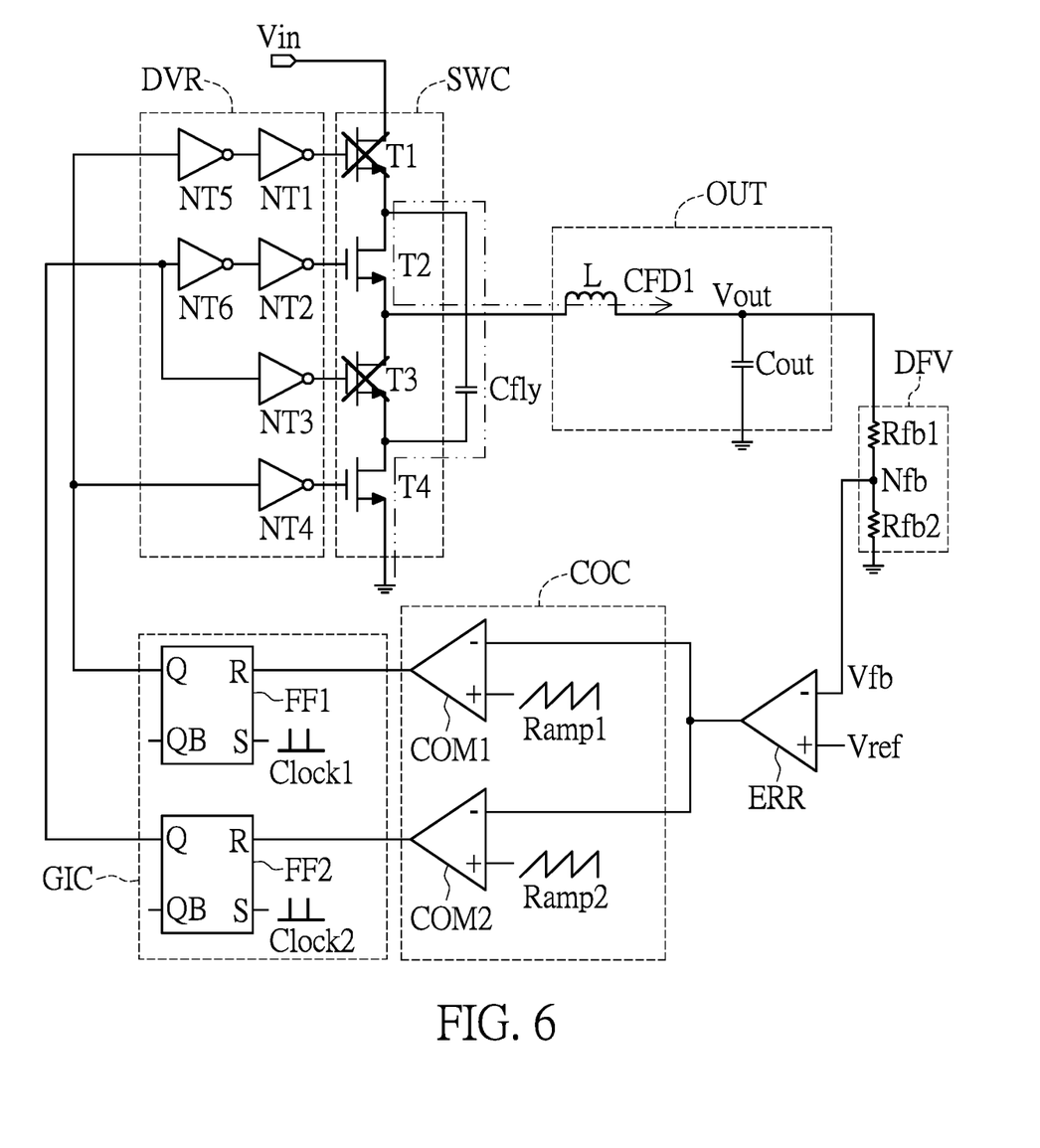
FIG. 6 is a schematic diagram of flowing of a current of the power converter with the automatic balance mechanism of the flying capacitor when the first and third transistors of the power converter are turned off and the second and fourth transistors of the power converter are turned on according to the first embodiment of the present disclosure.
Figure 7:
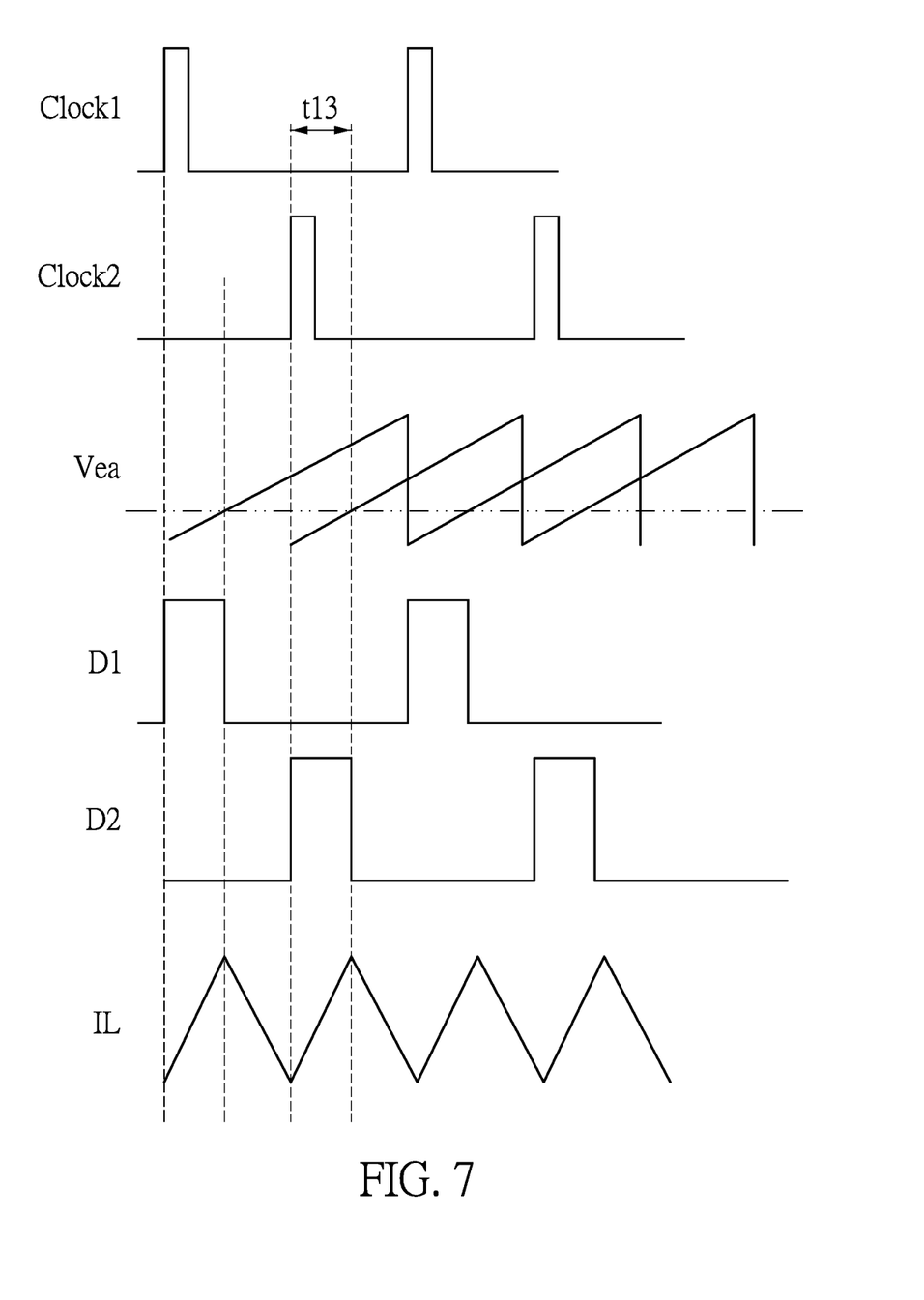
FIG. 7 is a waveform diagram of signals of the power converter with the automatic balance mechanism of the flying capacitor within a third time according to the first embodiment of the present disclosure.

Reference is made to FIGS. 6 and 7, wherein FIG. 6 is a schematic diagram of flowing of a current of the power converter with the automatic balance mechanism of the flying capacitor when the first and third transistors of the power converter are turned off and the second and fourth transistors of the power converter are turned on according to the first embodiment of the present disclosure, and FIG. 7 is a waveform diagram of signals of the power converter with the automatic balance mechanism of the flying capacitor within a third time according to the first embodiment of the present disclosure.

The first flip-flop FF1 shown in FIG. 6 outputs the first logic signal D1 at a low level for turning off the first transistor T1 and turning on the fourth transistor T4 during a time t13 as shown in FIG. 7. The second flip-flop FF2 shown in FIG. 6 outputs the second logic signal D2 at a high level for turning off the third transistor T3 and turning on the second transistor T2 during the time t13 as shown in FIG. 7.

Under this condition, the current flowing indicating signal CFD1 indicates that a current flows sequentially through the second transistor T4, the flying capacitor Cfly, and the second transistor T2 to the output inductor L. As shown in FIG. 3, the current of the inductor current signal IL gradually increases within the time t13.

It is worth noting that, as shown in FIG. 7, a working period of the first logic signal D1 is the same as a working period of the second logic signal D2, such that a voltage of the flying capacitor Cfly is equal to one half of the input voltage Vin. Each of a slope of the first ramp signal Ramp1 and a slope of the second ramp signal Ramp2 is proportional to the voltage of the flying capacitor Cfly. A difference between the input voltage Vin received by the switch circuit SWC and the voltage of the flying capacitor Cfly is proportional to the slope of the first ramp signal Ramp1 and the slope of the second ramp signal Ramp2.

Figure 8:
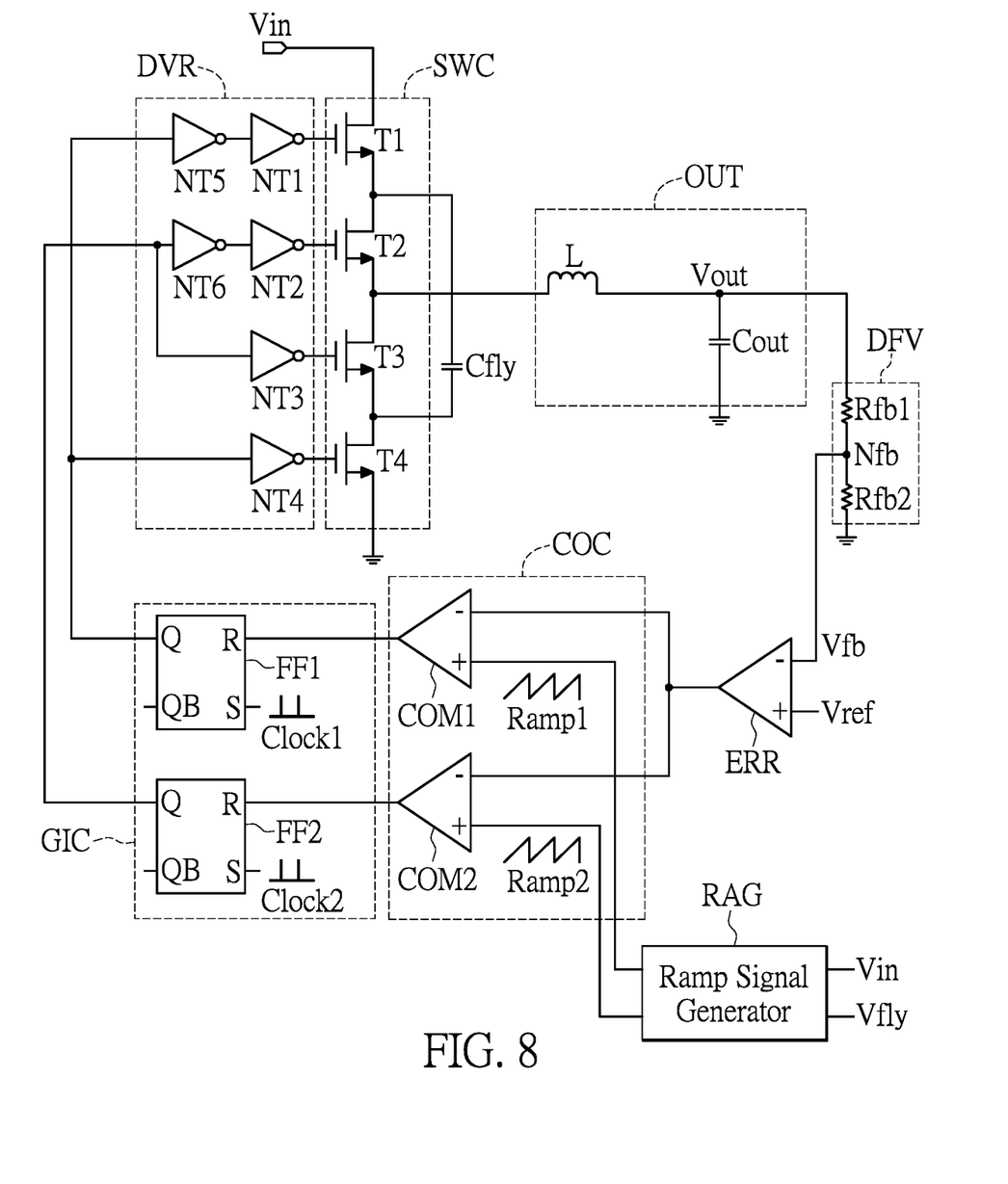
FIG. 8 is a circuit layout diagram of a power converter with an automatic balance mechanism of a flying capacitor according to a second embodiment of the present disclosure.

Reference is made to FIG. 8, which is a circuit layout diagram of a power converter with an automatic balance mechanism of a flying capacitor according to a second embodiment of the present disclosure.

A difference between the first and second embodiments is that, the power converter with the automatic balance of the flying capacitor of the second embodiment may further include a ramp signal generator RAG. The same descriptions of the first and second embodiments are not repeated herein.

An output terminal of the ramp signal generator RAG is connected to the second input terminal such as the inverting input terminal of the first comparator COM1 and the second input terminal such as the inverting input terminal of the second comparator COM2. The ramp signal generator RAG may output the first ramp signal Ramp1 and the second ramp signal Ramp2 respectively to the second input terminal of the first comparator COM1 and the second input terminal of the second comparator COM2, according to the input voltage Vin and the voltage of the flying capacitor Cfly.

Figure 9:
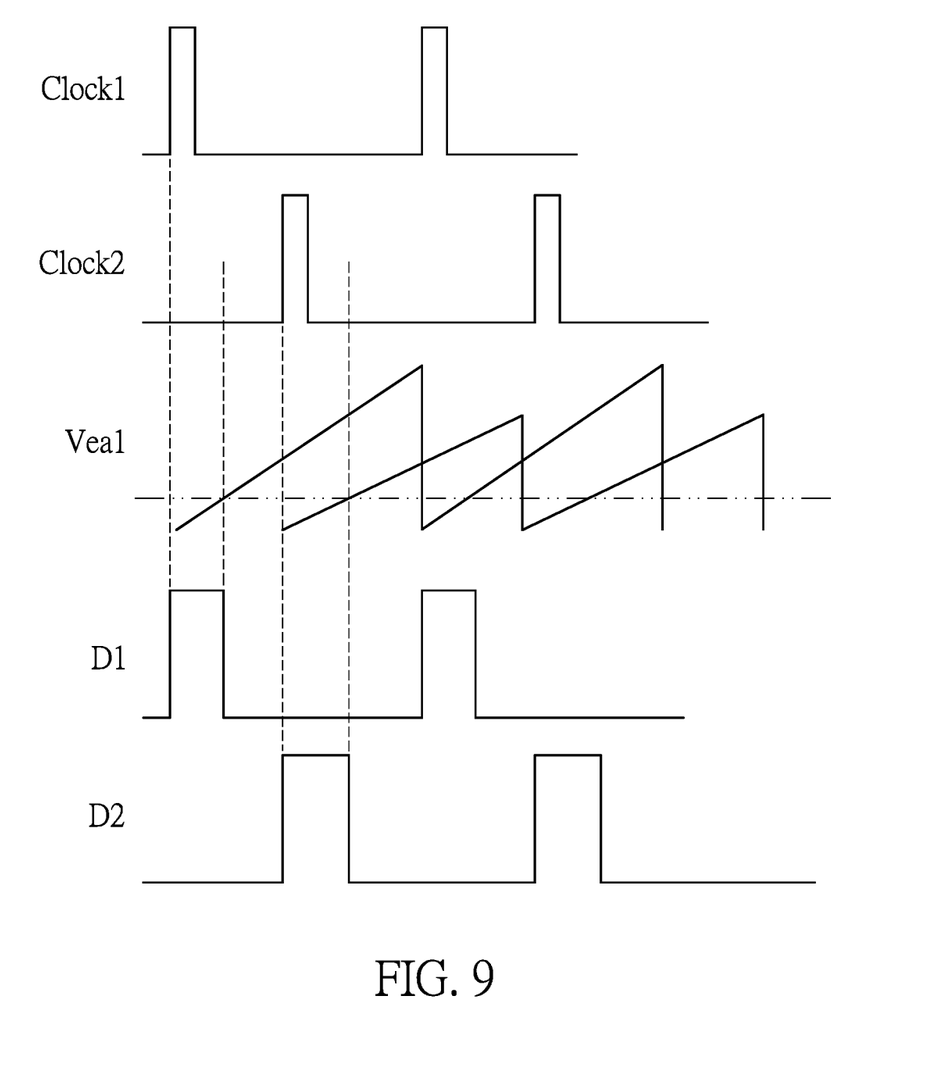
FIG. 9 is a waveform diagram of signals generated by the power converter with the automatic balance mechanism of the flying capacitor when a ratio of a working period of a logic signal to a total time is smaller than 0.5 and a voltage of the flying capacitor is higher one half of an input voltage according to the second embodiment of the present disclosure.

Reference is made to FIGS. 8 and 9, wherein FIG. 9 is a waveform diagram of signals generated by the power converter with the automatic balance mechanism of the flying capacitor when a ratio of a working period of a logic signal to a total time is smaller than 0.5 and a voltage of the flying capacitor is higher one half of an input voltage according to the second embodiment of the present disclosure.

The slope of the first ramp signal Ramp1 is equal to a constant value multiplied by the voltage of the flying capacitor Cfly, which is calculated by the following equation: SRamp1=k×Vfly, wherein SRamp1 represents the slope of the first ramp signal Ramp1, k represents the constant value, and Vfly represents the voltage of the flying capacitor Cfly.

The slope of the second ramp signal Ramp2 is equal to a constant value multiplied by the difference between the input voltage Vin and the voltage of the flying capacitor Cfly, which is calculated by the following equation: SRamp2=k×(Vin−Vfly), wherein SRamp2 represents the slope of the second ramp signal Ramp2, Vin represents the input voltage, k represents the constant value, and Vfly represents the voltage of the flying capacitor Cfly.

As shown in FIG. 9, a ratio of a working period of the first logic signal D1 to a total time of the first logic signal D1 is smaller than 0.5, and a ratio of a working period of the second logic signal D2 to a total time of the second logic signal D2 is smaller than 0.5.

When the voltage Vfly of the flying capacitor Cfly is higher than the one half of the input voltage Vin, the working period of the second logic signal D2 as shown in FIG. 9 that is outputted by the second flip flop FF2 shown in FIG. 8 is larger than the working period of the first logic signal D1 shown in FIG. 9 that is outputted by the first flip flop FF1 shown in FIG. 8. As a result, the voltage Vfly of the flying capacitor Cfly can be reduced to be equal to the one half of the input voltage Vin.

Figure 10:
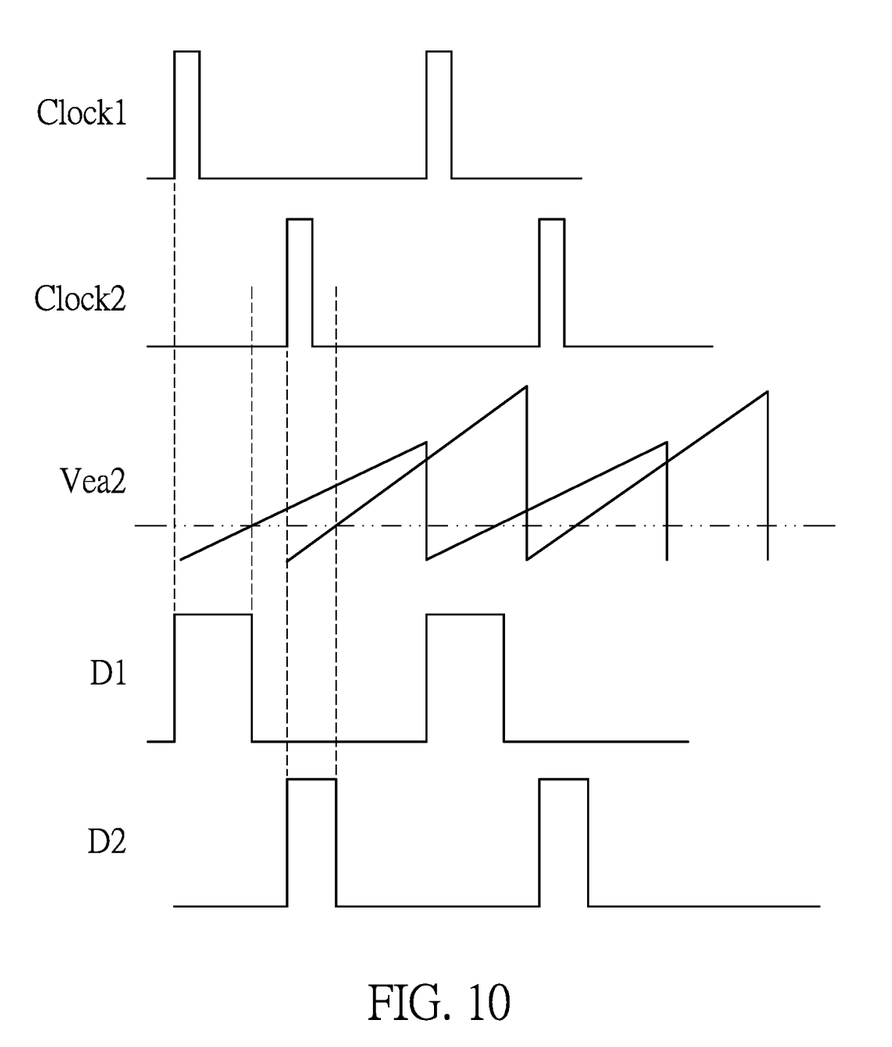
FIG. 10 is a waveform diagram of signals generated by the power converter with the automatic balance mechanism of the flying capacitor when the ratio of the working period of the logic signal to the total time is smaller than 0.5 and the voltage of the flying capacitor is lower than one half of the input voltage according to the second embodiment of the present disclosure.

Reference is made to FIGS. 8 and 10, wherein FIG. 10 is a waveform diagram of signals generated by the power converter with the automatic balance mechanism of the flying capacitor when the ratio of the working period of the logic signal to the total time is smaller than 0.5 and the voltage of the flying capacitor is lower than one half of the input voltage according to the second embodiment of the present disclosure.

As shown in FIG. 10, the ratio of the working period of the first logic signal D1 to the total time of the first logic signal D1 is smaller than 0.5, and the ratio of the working period of the second logic signal D2 to the total time of the second logic signal D2 is smaller than 0.5.

When the voltage Vfly of the flying capacitor Cfly is lower than the one half of the input voltage Vin, the working period of the first logic signal D1 as shown in FIG. 10 that is outputted by the first flip flop FF1 shown in FIG. 8 is larger than the working period of the second logic signal D2 as shown in FIG. 10 that is outputted by the second flip flop FF2 shown in FIG. 8. As a result, the voltage Vfly of the flying capacitor Cfly can be increased to be equal to the one half of the input voltage Vin.

Figure 11:
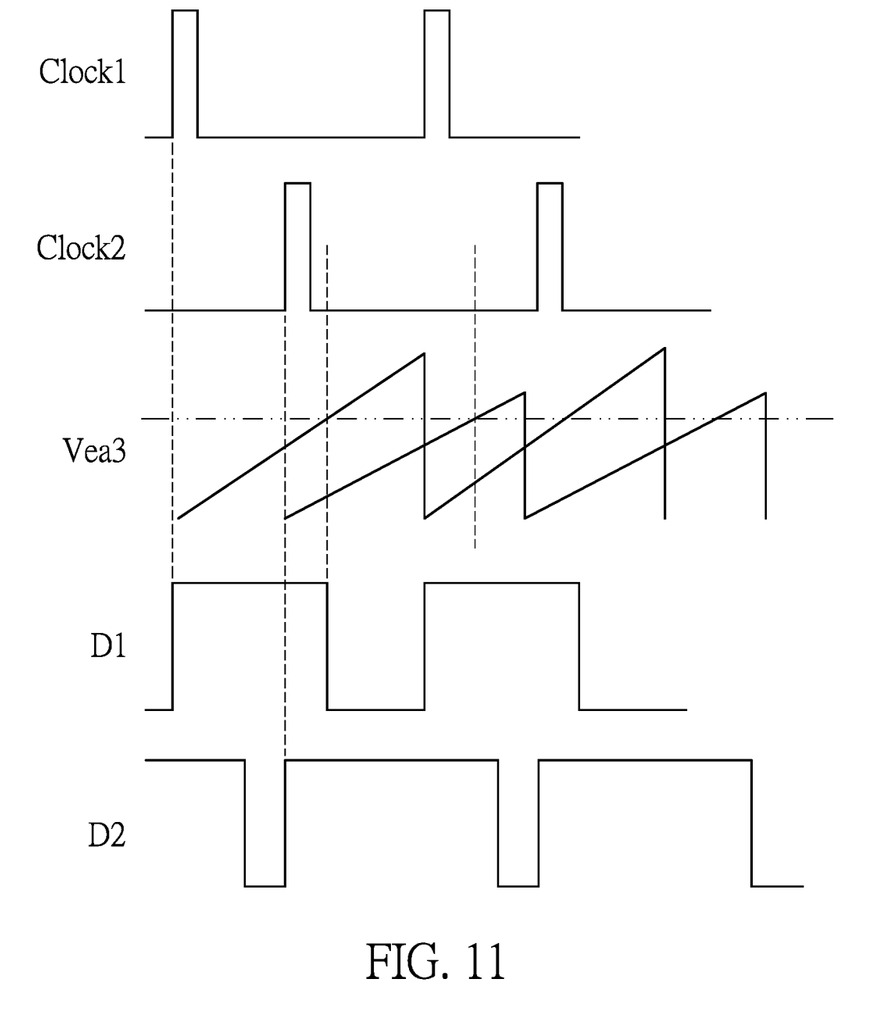
FIG. 11 is a waveform diagram of signals generated by the power converter with the automatic balance mechanism of the flying capacitor when the ratio of the working period of the logic signal to the total time is larger than 0.5 and the voltage of the flying capacitor is higher than one half of the input voltage according to the second embodiment of the present disclosure.

Reference is made to FIGS. 8 and 11, wherein FIG. 11 is a waveform diagram of signals generated by the power converter with the automatic balance mechanism of the flying capacitor when the ratio of the working period of the logic signal to the total time is larger than 0.5 and the voltage of the flying capacitor is higher than one half of the input voltage according to the second embodiment of the present disclosure.

As shown in FIG. 11, the ratio of the working period of the first logic signal D1 to the total time of the first logic signal D1 is larger than 0.5, and the ratio of the working period of the second logic signal D2 to the total time of the second logic signal D2 is larger than 0.5.

When the voltage Vfly of the flying capacitor Cfly is higher than the one half of the input voltage Vin, a non-working period of the first logic signal D1 as shown in FIG. 11 that is outputted by the first flip flop FF1 shown in FIG. 8 is larger than a non-working period of the second logic signal D2 as shown in FIG. 11 that is outputted by the second flip flop FF2 shown in FIG. 8. As a result, the voltage Vfly of the flying capacitor Cfly can be reduced to be equal to the one half of the input voltage Vin.

Figure 12:
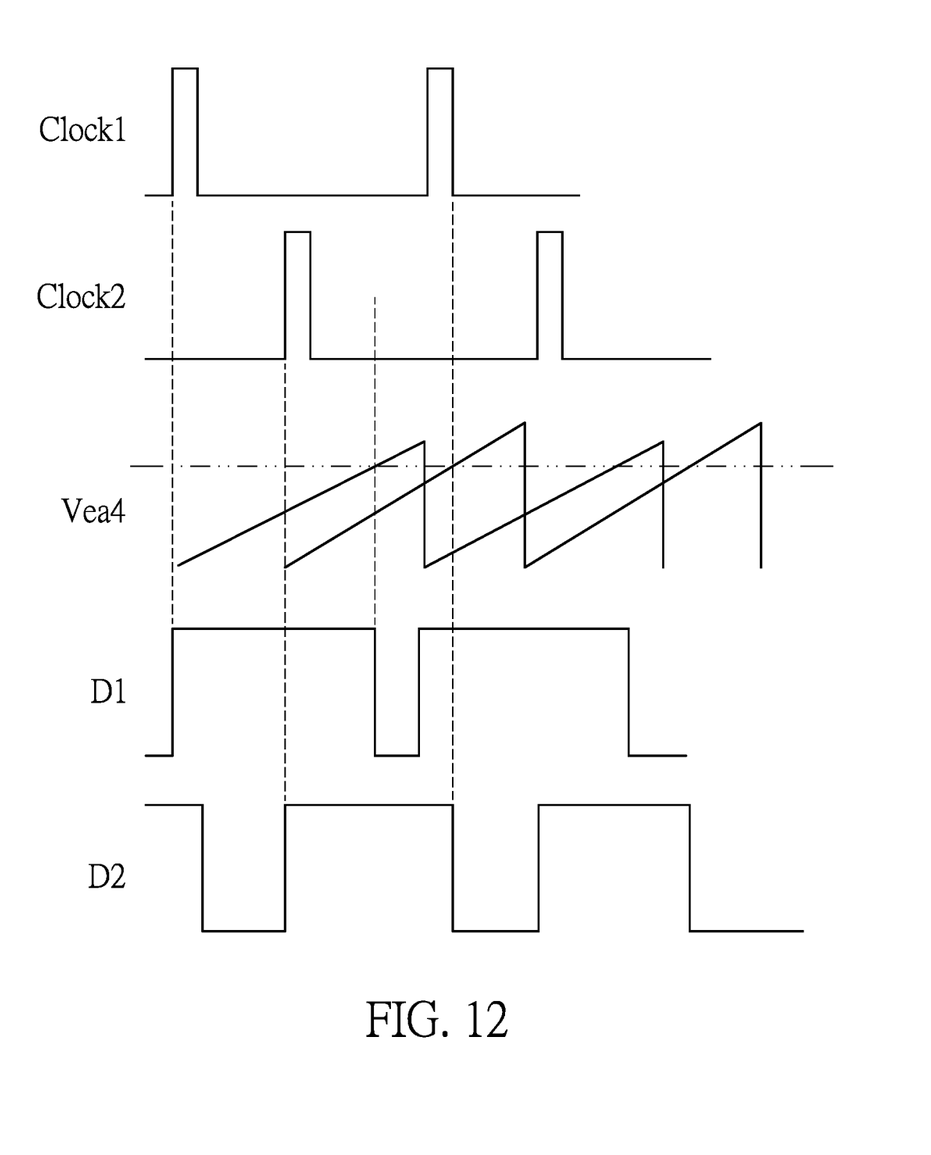
FIG. 12 is a waveform diagram of signals generated by the power converter with the automatic balance mechanism of the flying capacitor when the ratio of the working period of the logic signal to the total time is larger than 0.5 and the voltage of the flying capacitor is lower than one half of the input voltage according to the second embodiment of the present disclosure.

Reference is made to FIGS. 8 and 12, wherein FIG. 12 is a waveform diagram of signals generated by the power converter with the automatic balance mechanism of the flying capacitor when the ratio of the working period of the logic signal to the total time is larger than 0.5 and the voltage of the flying capacitor is lower than one half of the input voltage according to the second embodiment of the present disclosure.

As shown in FIG. 12, the ratio of the working period of the first logic signal D1 to the total time of the first logic signal D1 is smaller than 0.5, and the ratio of the working period of the second logic signal D2 to the total time of the second logic signal D2 is smaller than 0.5.

When the voltage Vfly of the flying capacitor Cfly is lower than the one half of the input voltage Vin, a non-working period of the first logic signal D1 as shown in FIG. 12 that is outputted by the first flip flop FF1 shown in FIG. 8 is smaller than a non-working period of the second logic signal D2 as shown in FIG. 12 that is outputted by the second flip flop FF2 shown in FIG. 8. As a result, the voltage Vfly of the flying capacitor Cfly can be increased to be equal to the one half of the input voltage Vin.

In summary, the power converter with the automatic balance mechanism of the flying capacitor of the present disclosure adjusts the working period of the logic signals for controlling the switch circuit according to the ramp signal having a slope that is proportional to the voltage of the flying capacitor, such that the voltage of the flying capacitor is balanced to be equal to the one half of the input voltage.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A power converter with an automatic balance mechanism of a flying capacitor, comprising:
    a switch circuit coupled to an input voltage;
    a flying capacitor connected to the switch circuit;
    an output circuit including an output capacitor and an output inductor, wherein a first terminal of the output inductor is connected to the switch circuit, and two terminals of the output capacitor are respectively connected to a second terminal of the output inductor and grounded;
    an error amplifier having a first input terminal connected to an output node between the output capacitor and the output inductor, and having a second input terminal coupled to a reference voltage, wherein the error amplifier is configured to output an error amplified signal according to an output voltage of the output node and the reference voltage;
    a comparator circuit connected to the error amplifier and configured to compare the error amplified signal with a ramp signal to output a comparison signal, wherein a slope of the ramp signal is proportional to a voltage of the flying capacitor, and a difference between the input voltage and the voltage of the flying capacitor is proportional to the slope of the ramp signal; and
    a driving circuit connected to the comparator circuit and the switch circuit, and configured to drive the switch circuit according to the comparison signal;
    wherein the switch circuit includes a first transistor, a second transistor, a third transistor and a fourth transistor, a first terminal of the first transistor is coupled to the input voltage, a first terminal of the second transistor is connected to a second terminal of the first transistor, a second terminal of the second transistor is connected to a first terminal of the third transistor, a first terminal of the fourth transistor is connected to a second terminal of the third transistor, and a second terminal of the fourth transistor is grounded,
    wherein the first terminal of the output inductor is connected to a node between the second terminal of the second transistor and the first terminal of the third transistor, and the driving circuit is connected to a control terminal of the first transistor, a control terminal of the second transistor, a control terminal of the third transistor and a control terminal of the fourth transistor;
    wherein a first terminal of the flying capacitor is connected to a node between the second terminal of the first transistor and the first terminal of the second transistor, and a second terminal of the flying capacitor is connected to a node between the second terminal of the third transistor and the first terminal of the fourth transistor;
    wherein the driving circuit includes a first inverter, a second inverter, a third inverter, a fourth inverter, a fifth inverter and a sixth inverter, negative terminals of the first inverter, the second inverter, the third inverter, the fourth inverter, the fifth inverter and the sixth inverter are respectively connected to the control terminals of the first transistor, the second transistor, the third transistor and the fourth transistor, positive terminals of the first inverter and the second inverter are respectively connected to negative terminals of the fifth inverter and the sixth inverter, and positive terminals of the third inverter, the fourth inverter, the fifth inverter and the sixth inverter are connected to an output terminal of the comparator circuit.

2. The power converter according to claim 1, further comprising:
    a logic circuit connected between the driving circuit and the comparator circuit and configured to output a logic signal according to the comparison signal, wherein the driving circuit drives the driving circuit according to the logic signal.

3. The power converter according to claim 1, wherein the comparator circuit includes a first comparator and a second comparator, a first input terminal of the first comparator and a first input terminal of the second comparator are connected to the error amplifier and receive the error amplified signal, a second input terminal of the first comparator and a second input terminal of the second comparator are respectively coupled to a first ramp signal and a second ramp signal that are included in the ramp signal, an output terminal of the first comparator is connected to the positive terminals of the fourth inverter and the fifth inverter, and an output terminal of the second comparator is connected to the positive terminals of the third inverter and the sixth inverter.

4. The power converter according to claim 3, further comprising:
    a logic circuit connected between the driving circuit and the comparator circuit and including a first inverter and a second inverter, wherein two input terminals of the first inverter of the logic circuit are respectively connected to the output terminal of the first comparator and coupled to a first clock signal, an output terminal of the first inverter of the logic circuit is connected to the positive terminals of the fourth inverter and the fifth inverter, two input terminals of the second inverter of the logic circuit are respectively connected to the output terminal of the second comparator and coupled to a second clock signal, and an output terminal of the second inverter of the logic circuit is connected to the positive terminals of the third inverter and the sixth inverter.

5. The power converter according to claim 3, further comprising:
    a ramp signal generator connected to the second input terminal of the first comparator and the second input terminal of the second comparator, and configured to output the first ramp signal and the second ramp signal respectively to the second input terminals of the first comparator and the second comparator according to the input voltage and the voltage of the flying capacitor.

6. The power converter according to claim 1, further comprising:
    a voltage divider circuit connected to the output node and the first input terminal of the error amplifier, and configured to divide the output voltage of the output node to output a feedback voltage to the first input terminal of the error amplifier, wherein the error amplifier is configured to output the error amplified signal according to the feedback voltage and reference voltage.

7. The power converter according to claim 6, wherein the voltage divider circuit includes a first voltage divider resistor and a second voltage divider resistor, the first input terminal of the error amplifier is connected to a feedback node between the first voltage divider resistor and the second voltage divider resistor, and the feedback voltage is at the feedback node.

* * * * *